No. 758,958. PATENTED MAY 3, 1904.
W. E. COFFIN.
SWINGING HEAD COUPLING.
APPLICATION FILED JAN. 28, 1904.
NO MODEL.

WITNESSES
Warren W. Swartz
H. W. Corwin

INVENTOR
Walter E. Coffin
by Bakewell & Byrnes
his Attorneys

No. 758,958.

Patented May 3, 1904.

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

SWINGING-HEAD COUPLING.

SPECIFICATION forming part of Letters Patent No. 758,958, dated May 3, 1904.

Application filed January 28, 1904. Serial No. 190,947. (No model.)

*To all whom it may concern:*

Be it known that I, WALTER E. COFFIN, of Cleveland, Cuyahoga county, Ohio, have invented a new and useful Swinging-Head Coupler, of which the following is a full, clear, and exact description, reference being had to the accompanying drawings, forming part of this specification, in which—

Figure 1:
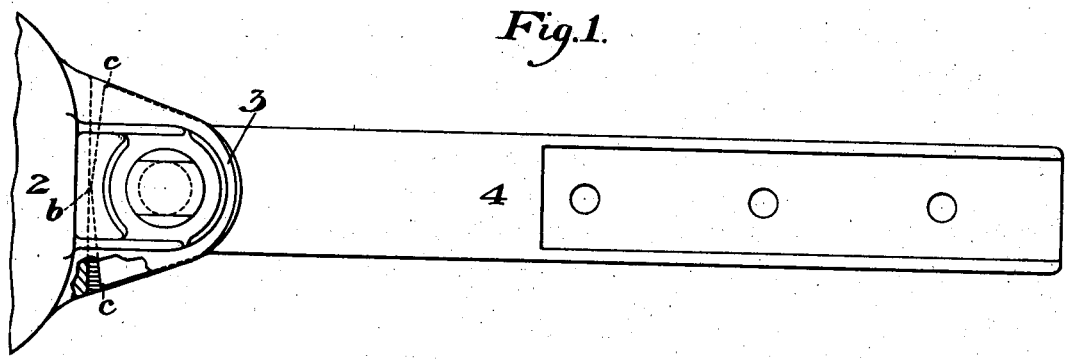
Figure 2:
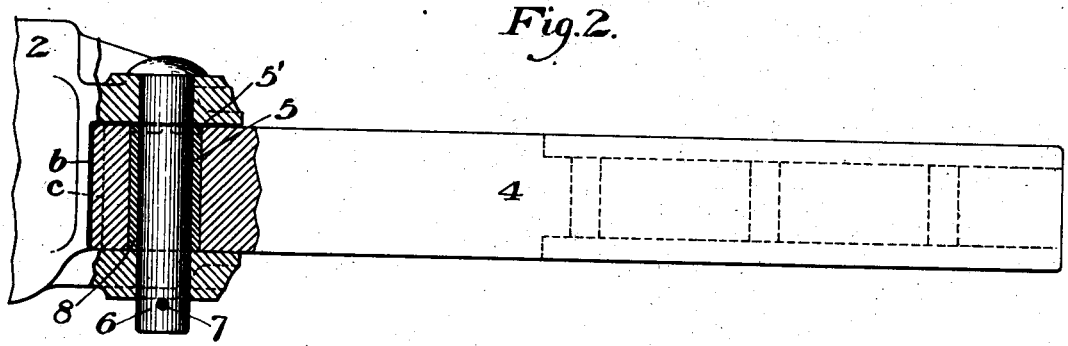
Figure 3:
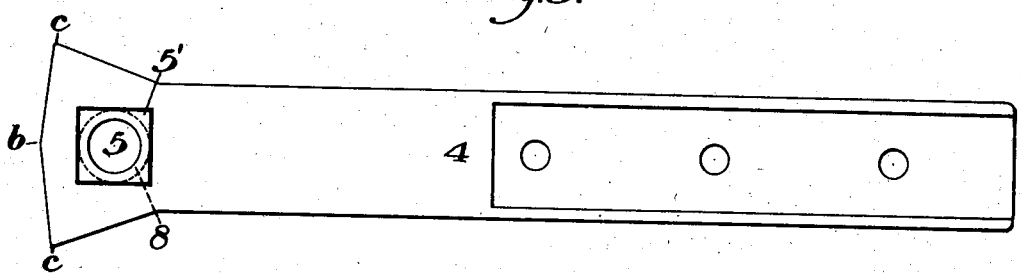

Figure 1 shows in plan view a swinging coupler-head constructed in accordance with my invention. Fig. 2 is a side elevation, and Fig. 3 is a detailed plan view, of the draw-bar shown in Figs. 1 and 2.

The purpose of my invention is to provide a pivotal connection between a coupler-head and its draw-bar or shank which will allow flexibility to the coupler-head in the act of coupling the cars and when the cars are passing around a curve and which will afford a stronger and better support for the coupler-head than other prior devices.

In the accompanying drawings, 2 represents a coupler-head, which may be of any suitable construction or type and is forked at its rear end, having two parallel rearwardly-projecting lugs or flanges 3 3, affording an intermediate space open at the rear and at the sides for the reception of the end of the draw-bar or shank 4, which is fitted therein and has a hole 5 adapted to register vertically with holes formed in the lugs 3 3. The shank is pivotally connected with the lug by a pivot-pin 6, which passes through the lugs and through the shank and may be held at the lower end by a pin or cotter 7.

To prevent wear in the hole of the draw-bar, I prefer to employ a steel bushing 8, whose internal diameter is substantially that of the pin 6, and I fit this bushing in the hole in the draw-bar. There is a squared recess 5' in the draw-bar around the hole, in which a correspondingly-squared portion of the bushing fits, so that the bushing is prevented from turning in the hole, and when its front or back surface is worn out it can be removed, turned a quarter-revolution, and replaced, when it will present new wearing-surfaces. The bushing may be otherwise held from turning. For example, instead of the squared head, above described, the entire bushing may have an angular exterior and may be fitted in an angular socket in the draw-bar. This bushing has been patented to me in my Letters Patent No. 693,238, dated February 11, 1902.

The front end of the draw-bar shank is preferably widened, as shown in Fig. 3, and its end is beveled on lines $c\,c$ from a middle point $b$, so that when the parts are assembled the point $b$ will preferably abut against the end of the coupler-head, but the adjacent beveled surfaces $b\,c$ will permit the coupler-head to have a radial movement in either direction on the pin 6, and said surfaces constitute stops which limit the radial movement.

Within the scope of the invention as defined in the claims the parts may be modified in many ways, since

What I claim is—

1. A swinging coupler-head having at its rear a forked socket open at the end and sides, and a draw-bar shank inserted in the socket; substantially as described.

2. A swinging coupler-head having at its rear a forked socket open at the end and sides, and a draw-bar shank inserted in the socket, said shank having a widened end; substantially as described.

3. A swinging coupler-head having at its rear a socket and a draw-bar shank inserted in the socket, the opposing surfaces of the end of the shank and the coupler-head within the socket diverging from a middle point; substantially as described.

4. A swinging coupler-head having at its rear a socket, and a draw-bar shank inserted in the socket, and having diverging end surfaces within the socket; substantially as described.

In testimony whereof I have hereunto set my hand January 25, 1904.

WALTER E. COFFIN.

Witnesses:
 OLIVER K. BROOKS,
 D. W. CALL.